(12) United States Patent
Chen et al.

(10) Patent No.: US 8,108,456 B2
(45) Date of Patent: Jan. 31, 2012

(54) METHOD AND APPARATUS FOR MIGRATING THE SYSTEM ENVIRONMENT ON WHICH THE APPLICATIONS DEPEND

(75) Inventors: Ying Chen, Beijing (CN); Ying Li, Beijing (CN); Liang Liu, Beijing (CN); Qian Ma, Beijing (CN); Ke Wei Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 12/057,752

(22) Filed: Mar. 28, 2008

(65) Prior Publication Data

US 2008/0270515 A1  Oct. 30, 2008

(30) Foreign Application Priority Data

Apr. 4, 2007 (CN) .......................... 2007 1 0092291

(51) Int. Cl.
- *G06F 15/173* (2006.01)
- *G06F 15/16* (2006.01)
- *G06F 1/24* (2006.01)

(52) U.S. Cl. ........ 709/202; 709/224; 709/226; 709/248; 713/100

(58) Field of Classification Search .................. 709/202, 709/226, 248; 713/100
See application file for complete search history.

(56) References Cited

U.S. PATENT DOCUMENTS

| 5,678,044 | A | 10/1997 | Pastilha et al. |
|---|---|---|---|
| 6,182,212 | B1 | 1/2001 | Atkins et al. |
| 6,370,646 | B1 | 4/2002 | Goodman et al. |
| 7,284,043 | B2 | 10/2007 | Feinleib et al. |
| 7,337,435 | B2 | 2/2008 | Bell et al. |
| 7,447,940 | B2 * | 11/2008 | Peddada .......................... 714/11 |
| 2003/0172373 | A1 | 9/2003 | Henrickson et al. |
| 2006/0106590 | A1 | 5/2006 | Tseng et al. |
| 2006/0153188 | A1 * | 7/2006 | Doi et al. ....................... 370/389 |
| 2008/0270515 | A1 * | 10/2008 | Chen et al. ..................... 709/202 |
| 2008/0281967 | A1 * | 11/2008 | Muhlestein et al. ........... 709/226 |

OTHER PUBLICATIONS

Richael Rabinovich, Zhen Ziao, and Amit Aggarwal, Computing on th edge: A platform for relicating internet appliations, 2003, One Microsoft Way, pp. 57-77.*

* cited by examiner

*Primary Examiner* — Emmanuel L Moise
*Assistant Examiner* — Farzana Huq
(74) *Attorney, Agent, or Firm* — Gail H. Zarick; Otterstedt, Ellenbogen & Kammer, LLP

(57) ABSTRACT

The present invention provides an effective method for migrating the system services on which applications depend, rather than all of the system services, from a source OS platform to a target platform, in order to provide a suitable and consistent environment for the applications, while reducing the cost of the migration. The migration method further classifies the configurations of system services on different platforms into common configurations and specific configurations to accelerate the determination of the source of a migration error.

18 Claims, 8 Drawing Sheets

| Checkbox | System Service | | OS | Discovery Command | Config File Location |
|---|---|---|---|---|---|
| ☑ | System | Kernel | AIX5.1 | lsattr | |
| ☑ | SSH | | AIX5.1 | | /usr/local/ssh/ssh_config |
| ☑ | User group management | | AIX5.1 | | /etc/group xx /etc/security/group |
| ☑ | File volume management | | AIX5.1 | lsvg-l | |
| ☑ | Printer management | | AIX5.1 | | /etc/qconfig |
| | Add | | | Discover | Cancel |

FIG. 4

METHOD AND APPARATUS FOR MIGRATING THE SYSTEM ENVIRONMENT ON WHICH THE APPLICATIONS DEPEND

CROSS-REFERENCE TO RELATED APPLICATION

This application claims priority under 35 U.S.C. §119 from Chinese Patent Application No. 200710092291.1, filed Apr. 4, 2007, the entire contents of which are incorporated herein by reference.

BACKGROUND OF THE INVENTION

The present invention relates to computer technology. More particularly, the invention relates to a method and an apparatus for migrating the system environment on which applications depend, from one platform to another.

With the rapid development of the information technology, the lifecycle of hardware and software tends to be shorter and shorter while the price to be lower and lower. Thus, enterprises often decide to update their software and hardware to meet their business requirements. At the same time, it is extremely desirable to migrate original application systems to a newly-built platform easily in order to fully utilize the existing investment on the application systems and reduce the cost and time of the migration.

In operating systems (OS), such as Unix/Linux, most applications cannot operate correctly without the support of OS services. So, one precondition of a successful application migration is to firstly migrate the system services on which the applications depend so as to supply a consistent operating environment on a target platform.

Even though the cost for updating hardware and software has been reduced due to the continuous raising of the performance-cost ratio, it is a highly time-consuming and labor-intensive process to migrate a system environment from an original OS platform to a target platform, and also with a great risk, particularly in a large data center or computing center. In such a case, it is always needed to migrate hundreds or even thousands of servers at one time. The applications dependant on system services cannot run correctly on the target platform without the successful migration of these system services, which, as a result, greatly degrades the business value of software/hardware updating.

Though there are several methods for assisting in application migration, few of them can solve the problem of migrating the configuration settings of the system services on which applications depend, so that the migrated applications likely cannot operate correctly. Further, among existing methods of system environment migration, none of them migrates only the system services on which the applications to be migrated depend directly or indirectly. During migration, a common method is to migrate all of the system services, regardless of whether they are really required by the applications to be migrated. Although it is a safe method to ensure that the same applications may not fail for some missing system services, but it is a time consuming and resource consuming migration method. In a large data center or computing center, in general, only one application or a few applications are deployed on a separate machine/platform to provide high performance and high reliability. As an example, an application needs to read files from a NFS server; then only the relevant services such as NFS, DNS and TCP/IP are required by the application, and other system services such as SSH, FTP, Inittab need not to be migrated. Hence, a more reasonable and more efficient migration method is to only migrate the system services on which the application depends directly or indirectly. In this way, the migration can be done more quickly, and can avoid the disadvantage of lacking some necessary system services. Another disadvantage of a common method for migrating system services is that it must be done manually, and not automatically. As is known by those skilled in the art, usually the process of migration is tedious, and involves many configurations of the system services. Therefore, it will be fallible without automatic support.

Further, when migrating system services, an existing method migrates specific configurations from one server to another serially. In general, there are many system services on a server, and there are many configurations about a system service. Thus, especially in large-scale system migration, a serial method will take more time and cost to complete the whole migration process. As known by those skilled in the art, although a lot of system services are to be migrated to target OS platforms, most of the system services have the same configurations on a plurality of servers located in a large data center/computing center, and only a few of them have server-specified values. Hence, a reasonable and feasible method is to fully utilize the common configuration settings of the system services to facilitate the migration of system services from a group of source operating system platforms to a group of target platforms in order to, for example, detect and correct configurations errors after the migration.

A method for migrating applications from a source computing platform to a target computing platform with a specific script is disclosed in the U.S. Pat. No. 6,370,646B, titled "Method and Apparatus for Multiplatform migration". Although this method can meet some requirements of migration, it is based on the assumption that the environment (that of the source and the target) on which applications depend is always available. And it is intended to acquire the configurations of the applications to be migrated, and focus on the migration of the applications themselves. It is necessary to develop different scripts or codes for different applications on the same source platform. As known by those skilled in the art, the success of migration depends on the running environment of the applications to a great extent. This method is only a specific method for application migration, and only takes the configurations information of the applications into account, but not considering the system environment on which applications depend. However, migrating applications without considering the system environment on which the applications depend is likely to fail.

A method for automatically migrating at least one software system on a source computing environment to a predetermined target computing environment is disclosed in the U.S. Pat. No. 5,678,044, titled "System and method for improved re-hosting of software systems". In general, the automatic migration method can be divided into three stages: the first is that a discovery utility evaluates the source computing environment and the software system to be migrated automatically, including acquiring the relevant configuration and description information thereof and finally forms an analysis report from such information. Then, based on the analysis report, the discovery utility determines whether the migration can be done with heuristic rules. The second is that a migration utility receives the acquiring results of the description information about the source computing environment and the software system to be migrated from the discovery utility in order to migrate the software system to a target computing environment automatically. Naturally, due to the difference between the two computing systems, the migration utility will convert the configuration files, programs and job control languages of the source software system into the descriptions suitable to the target system. The third is that a run-time service utility provides similar OS level support to that of the source computing environment for the software system migrated to the target computing environment. However, the method focuses on the migration of a software system, including programs, job control languages and data files, but not the migration of the system services on which applications depend. Because of the dependence of a software system on system services, migrating a software system merely cannot succeed. Although in that method, the information about the source computing environment is obtained, and it is also specified to provide similar OS level support by the run-time service utility in the target computing environment, actually system services are not migrated. In fact, in this method, the information about what run-time OS level services exist in the source computing environment is obtained, and then such services are provided in the target computing environment. But this method does not emphasize migrating only the services related to the software system to be migrated, neglecting unrelated ones, and it is not obvious to find out what services are related to the software system. In addition, a computing environment may comprise several computers, hence, migrating system services from a source computing environment to a target computing environment may relate to many-to-many migration, which is not considered in this method.

A method for migrating configurations and data on a Linux OS to a Windows OS automatically is proposed in US patent application No. US20060064474A1, titled "System and method for automated migration from Linux to Windows". This method firstly finds out a list of machines in a network, and selects an available machine to be migrated and a migration target. Then it evaluates the migration target, for example, determines whether a proper OS and services for which the configurations on the source computing environment need to be migrated are installed, and if not, installs them automatically. Secondly, it finds out the configurations on the source computing environment automatically, and then converts them to the configurations on the target computing environment by a configuration converting utility. At last, this method sets the configurations on the target machine automatically. Especially, it is described specifically in this patent that if there is a directory server in a network, the directory service can be migrated to a new machine automatically. However, the object of this patent is still to form a similar target machine to the source machine, so all the system services on the source machine and their configurations are migrated to the target machine, rather than only migrating the system services related to the upper level software system to be migrated and not the unrelated ones. In addition, this patent does not relate to the problem of dividing the system services in the source computing environments on multiple platforms into common configurations and specific configurations and treating them separately when migrating them from one computing environment to another computing environment. Further, this method focuses on the migration from Linux to Windows, instead of a migration that can be applied generally between various platforms.

A tool capable of migrating user selected software from one machine to another automatically is disclosed in US patent publication No. US20030172373A1, titled "Non-script based intelligent migration tool capable of migrating software selected by a user, including software for which said migration tool has had no previous knowledge or encounters". The tool is a non-script based tool, and does not require knowledge about the software to be migrated in advance. First, the tool scans a specified machine, including the directories and files thereof, and then organizes the scanning result in some way, such as by the names of the directories, files, etc., then assigns such information to a certain application group based on some rules. Application groups to be evaluated are generated according to the foregoing steps, and then are analyzed to select application groups with complete configuration information. On the other hand, the tool compares the target machine with the source machine to remove software unnecessary to be migrated. Finally, it combines the results of the above two steps to present selectable software for a user. When the user has selected one or more software, the tool begins the migration. However, this tool concerns the migration of a software system other than the migration of the system services on which applications depend. Because of the dependence between a software system and system services, without migrating the system services successfully, migrating a software system merely cannot succeed. In addition, as described in that application, only the files and data belonging to the software itself are found, but not the configurations of the system services on which the applications depend. The tool first scans all the information on a machine, and then carries out classification based on specific rules to determine the information possibly relevant to the software to be migrated, rather than obtaining information about the dependence on the system services through monitoring the software at run-time, or through user input, Strictly speaking, since the information about the system services on which applications depend cannot be obtained by the classification method of the tool, such system services cannot be determined by the tool. Moreover, the system services are hierarchical, that is, an application may depend on some system services, and these services may depend on some other services also. The tool of that application cannot obtain such information. Finally, that application does not relate to the problem of dividing configuration information of the system services on multiple platforms into common configuration information and specific configuration information, and therefore, does not include one-to-many and many-to-many migrations.

A method for migrating configuration data of an existing program to another new program is proposed in US patent publication No US20030130980A1, titled "Efficient configuration data migration technical". This method installs a function module in the program to be migrated for collecting relevant configuration information every time the program is executed, and then writing them in an internal table. When migrating, data stored in the internal table are converted into a format suitable for the target program, i.e., formed into the configuration file of the target program to complete the migration. However, the method is complicated as it obtains the configuration information of the program to be migrated by changing the source program. Moreover, the method can only find out the configuration data associated with the program itself, but not the configuration data of the system services on which the program depends. Also, the configurations of the system services on which the program depends are hierarchical, and that method cannot obtain the information about the system services on which an upper level application depends indirectly. Again, the method does not concern the problem of one-to-many and many-to-many migrations, and so does not relate to distinguishing between common configurations and specific configurations on multiple platforms to facilitate the migration.

Hence, a method and an apparatus is desirable for migrating only the system services on which applications depend directly or indirectly, and when performing migration related to multiple servers, utilizing the fact that system services share some common configurations on a plurality of servers to facilitate detection and correcting configuration errors occurring after the migration.

BRIEF SUMMARY OF THE INVENTION

The present invention provides effective method for migrating the system services on which applications depend, rather than all of the system services, from a source OS platform to a target platform, in order to provide a suitable and consistent environment for the applications, while reducing the cost of the migration. The migration method according to the present invention further classifies the configurations of system services on different platforms into common configurations and specific configurations to accelerate the determination of the source of a migration error.

The present invention further provides a method for migrating the system environment on which one or more applications depend between platforms, comprising the steps of: discovering system services on which the applications depend directly during the operation of the applications on a source platform; obtaining the system services on which the applications depend indirectly from a dependency model of the system services on the source platform and the discovered system services on which the applications depend directly; discovering the configurations of the system services on which the applications depend directly and indirectly; based on the mapping relationships between the system services on which the applications depend directly and indirectly and their configurations on the source platform and the target platform, mapping the system services on which the applications depend directly and indirectly and their configurations on the source platform to those for the target platform; and setting the system services on which the applications depend directly and indirectly and their configurations for the target platform on the target platform to realize the migration of the system environment on which the applications depend from the source platform to the target platform.

The present invention further provides a method for migrating applications between platforms, comprising the steps of: migrating the system services on which the applications depend directly and indirectly from a source platform to a target platform according to the above method; and migrating the applications from the source platform to the target platform.

The present invention further provides an apparatus for migrating the system environment on which one or more applications depend between platforms, comprising: a discovery agent configured to: discover the system services on which the applications depend during the operation of the applications on a source platform, obtain the system services on which the applications depend indirectly from a dependency model of the system services on the source platform and the discovered system services on which the applications depend directly, and discover the configurations of the system services on which the applications depend directly and indirectly; a migration assisting module configured to map the system services on which the applications depend directly and indirectly and their configurations on the source platform to those for a target platform according to the mapping relationships between the system services on which the applications depend directly and indirectly and their configurations on the source platform and target platform; a setting agent configured to set the system services on which the applications depend directly and indirectly and their configurations for the target platform on the target platform to realize the migration of the system environment on which the applications depend from the source platform to the target platform.

The present invention further provides an apparatus for migrating applications between platforms, comprising: the above apparatus for migrating the system services on which the applications depend directly and indirectly from a source platform to a target platform; and means for migrating the applications from the source platform to the target platform.

The present invention provides a computer readable storage device storing a computer program therein, the computer program having a plurality of sections of code, which, when executed by a machine, cause the machine to perform the steps of the above method.

The present invention further provides a method to ensure that the applications can operate correctly in the new target system, while reducing the cost and risk of the migration also. It is very useful for a system administrator or a system migration engineer. Without unrelated services, the applications can acquire higher performance in the target system. Furthermore, the method can also avoid the potential conflict between different services. As a result, a more stable environment on which the applications depend is obtained.

The method of the present invention is useful to a system administrator or a system migrating engineer, for it can improve the efficiency of migration greatly. Further, errors in the migration can be detected more efficiently based on the classification of common configurations and specific configurations.

BRIEF DESCRIPTION OF THE DRAWINGS

FIG. 4 shows a possible example of a discovery guide.

DETAILED DESCRIPTION OF THE PREFERRED EMBODIMENTS

Figure 1:
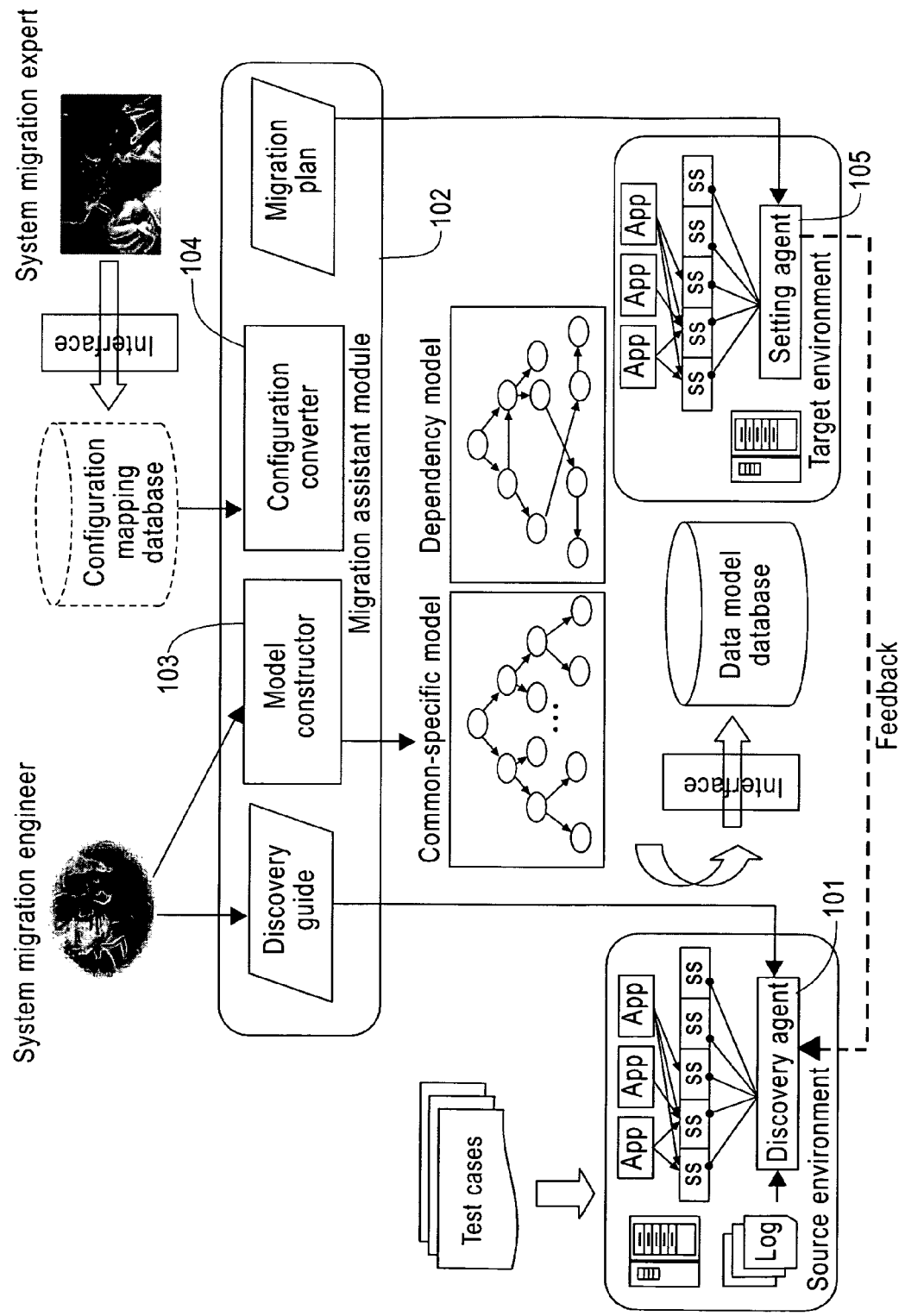
FIG. 1 shows a general framework of the present invention.

The present invention provides a method and an apparatus for migrating the system services on which applications depend from a source platform to a target platform to ensure that the applications of the source platform can operate on the target platform without any loss of functions. An effective method is provided to find out the system services on the source OS platform, which system services are necessary for the applications to be migrated to operate on the target platform correctly. And then, the method can help to migrate these system services by analyzing the configuration mappings between different platforms and the dependent relationships among different services. The present invention mainly utilizes three modules to perform the migration, wherein a discovery agent is used to discover the system services on which the applications to be migrated depend directly or indirectly and the configurations of these system services. A migration assistant module is used to map all of the discovered system services and their configurations on the source platform into those on a target platform according to the mapping relationships of system services between the different platforms. A setting agent is used to set the mapped system services and their configurations on the target platform. Test cases and a discovery guide are also introduced to help the discovery agent to discover necessary system services, and to reduce the cost of the discovery at the same time. Moreover, a feedback mechanism is also introduced to ensure that all of the necessary system services have been discovered. The discovery process according to the present invention is substantially an automatic process, and does not require interaction with humans or the control of instructions from a user. This can reduce time consumption greatly, and decrease the possibility of making mistakes during the migration of hundreds of machines.

Next, preferred embodiments of the present invention will be described with reference to the drawings. However, the present invention is not limited to the specific embodiments described herein, on the contrary, any combination of the following features and elements can be contemplated to implement and practice this invention, regardless of whether they refer to different embodiments. Further, many advantages of the present invention are provided in the embodiments. However, although the embodiments of the present invention can obtain advantages over other possible solutions and/or existing techniques, whether a certain advantage is obtained by a given embodiment is not a limitation of the present invention. Hence, the following aspects, features, embodiments and advantages only serve as illustrations, and cannot be treated as elements or definitions of the appended claims, unless indicated explicitly otherwise. Similarly, "the present invention" used herein cannot be explained as the generalization of any subject matter disclosed herein, and cannot be treated as elements or definitions of the appended claims, unless indicated explicitly otherwise.

FIG. 1 illustrates a general framework of the present invention, which shows the components of an apparatus for migrating a system environment on which applications depend according to an embodiment of the present invention. In general, the solution for migrating a system environment on which applications depend includes three stages: discovery stage, conversion stage and setting stage.

In the discovery stage, a discovery agent discovers the system services on which applications depend directly or indirectly on a source platform. The discovery agent operates as a system monitor to record all the system service calls made by the applications.

Preferably, the discovery agent discovers system services on which applications depend by monitoring system service calls from applications, and in particular, recording all the system service calls from applications by deploying a probe, which is used to identify the interaction between the applications and the system services. Usually, this monitoring method can only capture direct dependence. Therefore, the complete dependent relationships among the system services on the source platform is provided to the discovery agent, and based on the discovered system services on which the applications depend directly, the discovery agent uses the dependent relationships among the system services as a priori knowledge to deduce all the other system services on which the applications depend indirectly. Alternatively or additionally, the discovery agent may identify the system services on which applications depend in other ways, such as by viewing the logs of the applications.

For the purpose of reducing the workload of the discovery agent, the discovery agent may be provided with a discovery guide, which enables the discovery agent to discover system services listed in the guide directly, rather than discovering the system services on which applications depend by capturing the interaction between applications and system services with a probe. The discovery agent will treat the discovery guide as a priori knowledge and as a supplement or an alternative to the regular discovery process to reduce the cost of discovering system services.

An application may not call all of the required system services during its normal operation. For example, autoFS is used for installing a partition on a remote system automatically as the remote system is accessed by an application. Because the application may access such partitions only rarely, the autoFS may not be called in the normal operation of the application. Hence, some test cases for the application can be used to increase the workload of the application. On the one hand, these test cases can be used to check the reliability of the system; on the other hand, they can be used to help the discovery agent to discover more system services required by applications.

After all the system service dependence of the applications has been captured, the discovery agent will obtain the configurations of the system services automatically.

In the conversion stage, according to the results of the configuration discovery process, the migration assistant module constructs the instance of a data model describing the configurations of the system services and the dependent relationships among system services. It should be noted that, the instance only represents the configuration parameters of the system services on which applications depend and the dependent relationships among them, but not those of all the system services.

In addition, preferably, when the method and apparatus of the present invention is used for migrating system services on which applications depend on multiple source platforms to multiple target platforms, the configurations of system services on different machine may be divided into common and specific configurations to form a common-specific configuration model. As a supplement to the above dependency model, the common-specific configuration model is used to facilitate identifying the source of errors occurring in the migration.

Then, based on the mapping relationships between the system services and their configurations on the source platform and the target platform, a configuration converter in the migration assisting module converts the above dependency model instance of the system services on the source platform into that on a target platform, and preferably, converts the above common-specific configuration model of the system services on the source platform into that for the target platform, and then sends it to the setting agent.

In the setting stage, the setting agent sets the discovered system services and their configurations on the target platform based on the dependency model instance for the target platform, and supplies a compensation feedback (indicating the missing system services) to help the discovery agent to discover the configurations of the missing system services of the source platform. Similarly to the above described discovery process on the source platform, in order to discover the required missing system services on the target platform, an administrator or migration engineer can supply a discovery guide to provide some clues to the setting agent. The applications to be migrated may also be test with the same test cases as those on the source platform. The whole process, including the discovery stage and the migrating stage, can be repeated several times to ensure that the test cases have passed on the source platform can also pass on the target platform.

Figure 2A:
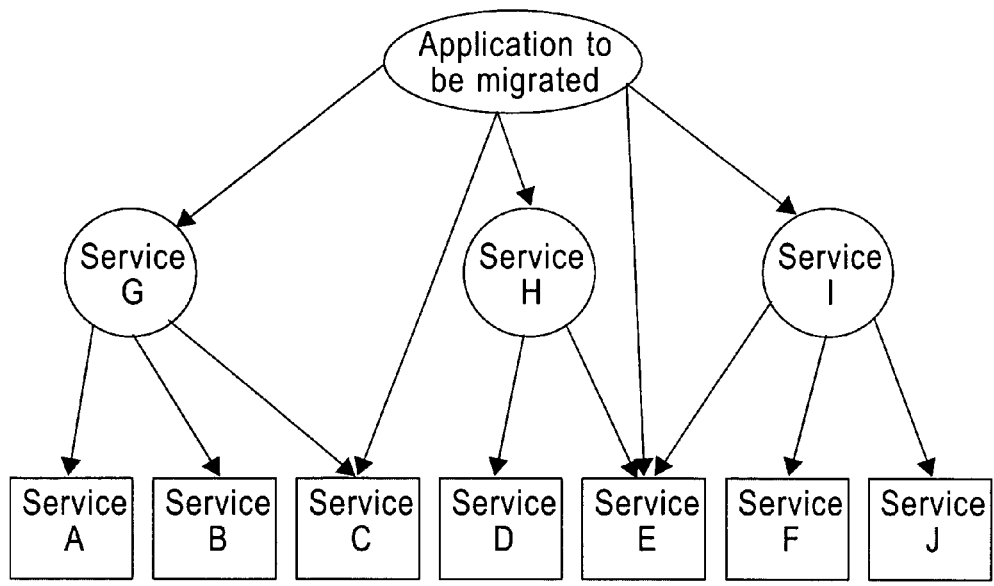
FIG. 2 shows an actual example of the system services associated with a specific application, their hierarchical structure, and the relationships among some of the system services associated with the network function.
Figure 2B:
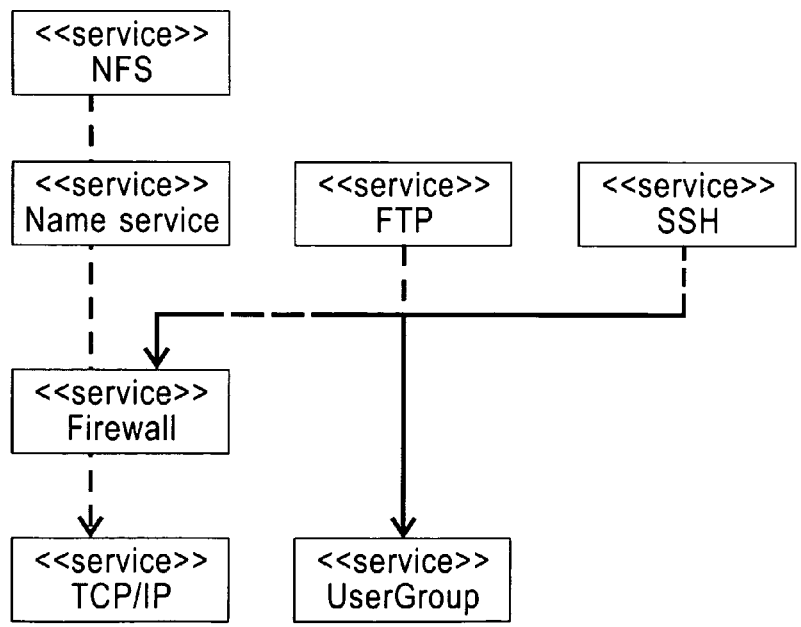

A key point of the migration is to use the dependent relationships among the system services to be migrated. In a preferred embodiment of the present embodiment, a data structure, such as a tree or graph, is used to represent the dependent relationships among system services. Such dependent relationships are arranged in a hierarchical structure. For example, the system services related to a specific application and the dependent relationships among such system services are shown in FIG. 2. In this figure, an application depends on services C, E, G, H, I directly, and depends on other services indirectly. The dependent relationships among the system services related to a networking function are shown on the right side of the figure. The dependency model reflecting the dependent relationships among all the system services on the source platform has been built into the migration assistant module as a priori knowledge. And in the conversion stage, after the discovery agent has captured the system service dependence of the applications, the migration assistant module will extract the corresponding portion of the dependency model according to the system services on which the applications depend directly or indirectly, which have been discovered by the discovery agent, and then construct such a kind of data structure, and put the associated configuration information into the data structure to create a run-time instance representing the dependent relationships among the system services of the source platform and their current configurations. In other words, in general, a sub-model of the whole dependency model is generated. Then, the migration assistant module will convert the dependency model instance into a dependency model instance for the target platform according to the mapping relationships between the system services and their configurations of the source platform and the target platform, and then send it to the setting agent. Then, in the setting stage, based on the dependent relationships among the system services and the configurations of these system services represented by the dependency model, the setting agent will set the system services and their configurations on the target platform. During this process, the system services on which some other system services depend and their configurations will be set prior to the setting of the other system services depending on them.

Figure 3A:
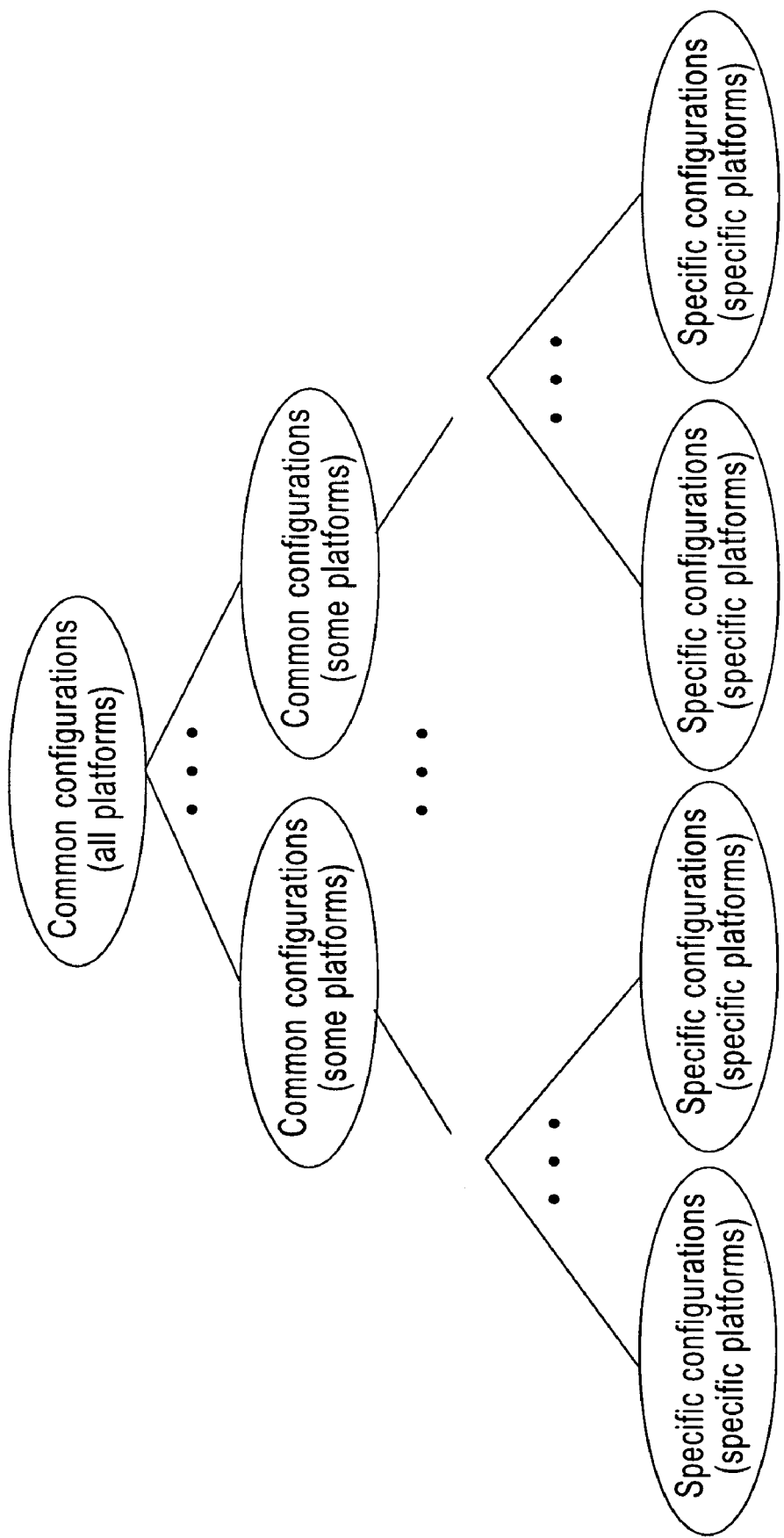
FIG. 3 shows a framework of common-specific configuration model and a particular example of the common-specific configuration model.
Figure 3B:
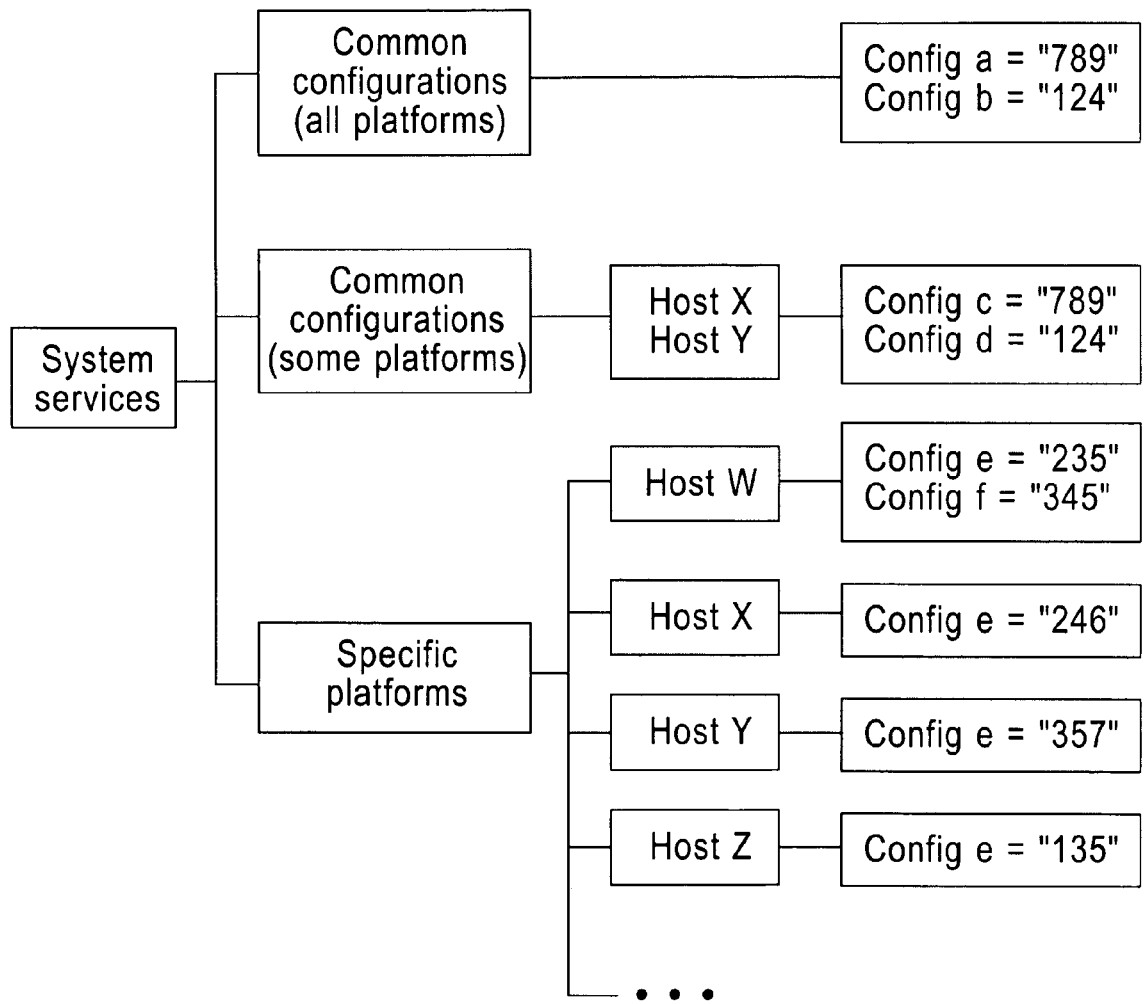

Another key point in the preferable embodiment of the present invention is the common-specific configuration model of the system services. In general, although there are hundreds or even thousands of servers in a large data center or computing center, the configurations of most of the system services on them are the same in order to meet the requirements of applications (computing tasks), and to facilitate the management by a system administrator, and only a few of them have specific configurations. For instance, in the large scale parallel computing, a task dispatcher often needs to log into multiple servers using the same rsh configurations to initiate multiple computing tasks. Another example is the configurations of NIS. An administrator often establishes a NIS server in a data center or computing center to facilitate the name service management. In other words, the NIS client configurations in many servers are the same. Based on this fact, a preferred embodiment of the present invention constructs a common-specific data model of the system services according to the discovered configurations of the system services on which applications depend. In this model, system services may be divided into two categories. One is common configurations, and the other is specific configurations. For example, usually a DNS' configurations can be divided into two parts on a server: DNS server's configurations for locating a remote name service server to perform name resolution, and local files, such as the /etc/hosts in the Linux system, for recording the mappings between domain names and IP addresses in a local machine. In a large server cluster, the DNS server's configurations are usually the same, but the local files will depend on different hosts. Therefore, the configurations of the DNS service can be divided into the DNS server's configuration as common configuration settings and the /etc/hosts files as specific configuration settings. However, the common configurations can be further divided. In other words, the common-specific configuration model can be constructed in a hierarchical form. The top level of the hierarchical structure represents the common configurations of the system services on a set of source platforms, which means that all the platforms have these configurations; the next level represents the configurations shared by some but not all of the platforms. The lowest level represents specific configurations only present on a single platform. The hierarchical common-specific configuration model makes it possible to find out the source of errors occurring in the migration more effectively. FIG. 3 shows the framework and an example of this common-specific configuration model.

This common-specific configuration model can improve error detection of the migration. When a configuration error of a system service occurs during the operation of an application on the target platform, the category of the configuration can be checked first. If the configuration belongs to a specific configuration, the error may be specific to the target platform. The system administrator or system migrating engineer may analyze the configurations of the platform carefully to find out the cause of the error. It may be due to a wrong migration decision, failing to set a parameter value on the target platform, or other causes. Otherwise, if the configuration belongs to a common configuration, the administrator or system migrating engineer may check to see whether the same error is reported on the other target platforms. If so, it may likely be due to a wrong migration decision. For example, the administrator or system migrating engineer may have changed the network information mistakenly during the migration, so that, after the migration, the target server is placed in a subnet different to the source server. Hence, it cannot access some services of the source subnet. To correct this error, the migration decision can be changed, rather than changing the configurations on the target platform. If the error occurs in a single platform, the administrator or system migrating engineer may consider that there is no problem in migration decision, and no mistake in the common configurations, and then may skip checking the common configurations, and proceed to analyze other platform-specific configurations of the system service, or the configurations of other system services on which that system service depends.

The apparatus for migrating a system services environment on which applications depend according to the preferred embodiment of the present invention will be described hereinafter in detail. As shown in FIG. 1, the apparatus comprises:

a discovery agent 101 for discovering/capturing system services on which the given applications depend or used by the applications directly, for example, through capturing system service calls from the applications by a probe during the operation of the applications; based on a model of dependent relationships among the system services on the source platform, which is provided as a priori knowledge, and the discovered system services on which the applications depend directly, obtaining the system services on which the applications depend indirectly; and finding the configuration information of the corresponding system services. Preferably, the discovery agent 101 can be an automatic tool developed with any kind of programming languages for discovering and capturing system services and the associated configuration information for applications to be migrated on the source platform.

For example, in a Windows platform, the hook API provided by the Windows can be used to inject a probe as a DLL into a Windows daemon responsible for dispatching all processes in the Windows to capture all the function calls occurring in the run-time for analysis. As such, the probe can capture all the direct system service calls made by applications.

When the discovery agent 101 has discovered the system services on which applications depend or used by the applications directly, based on the dependency model of the system services on the source platform provided as a priori knowledge and the discovered system services on which the applications depend directly, the system services on which applications depend indirectly may be obtained. The system service dependency model of the source platform provided as a priori knowledge can be stored in the discovery agent 101, the migration assistant module 102, or it can be stored separately, such as in a database. It can be created and edited by a system administrator or migration engineer in advance. After the discovery agent 101 has discovered the system services on which applications depend directly, by mapping the discovered system services to the dependency model, and then using a simple mathematical method to infer the system services on which applications depend indirectly, a sub-model of the dependency model, that is, a data model reflecting the dependent relationships among the system services on which the applications depend directly and indirectly, can be obtained.

After discovering the system services on which the applications depend directly and indirectly, the discovery agent 101 will start to discover the configurations of the system services. A preferred method for acquiring configurations is to develop a shell script for a corresponding system service to capture its configurations. For example, a script associated with the NFS service can be used to capture all the configurations of a NFS server, that is, the configurations in the NFS sharing records in the server. The results of the configuration discovery will be used to construct an instance of a dependency model representing the current configurations of the source platform. The configuration files of system services are usually located in a directory specific to a particular OS, for example, the directory /etc of the Unix/Linux OS stores the configuration files of many system services, and these files always have fixed file names. In addition, the configurations of system services may also be acquired by specific OS commands, e.g., obtaining the configurations of kernel parameters of an OS by a command. In an embodiment of the present invention, the scripts for discovering configurations of the corresponding system services may be built into the discovery agent 101; in another embodiment of the present invention, the scripts may be built into the migration assistant module 102 described herein below; of course, the scripts may also be a separate module. When the discovery agent 101 has determined what system services need to be discovered through a preliminary monitoring, the corresponding script can be used to acquire the configurations of the system services. The script acquires the system service configurations through reading a specific service's configuration files in a particular directory, or through executing a specific OS command. In rare cases, the place of some configurations on a server may have been customized by the system administrator, for example, through changing the name of a configuration file artificially. In such cases, it is needed to interact with the user to get the changed information. Apart from using scripts, other methods such as interacting with the user can be used to cause the discovery agent 101 or the migration assistant module 102 to discover the configurations of the system services.

The discovery agent 101 can uses a discovery guide listing all or some of the system services on which applications depend (and possibly, the method for discovering the configurations and/or the location of the configurations), provided by the system administrator or the migration engineer as an input, to verify/discover/capture the relevant required system services given by the guide (including the configuration information). This can accelerate the whole discovery process. A user guide listing all the system services can be provided to the system administrator or the migration engineer, from which the administrator or the migration engineer can select one or some system services he deemed as necessary for the applications to form the discovery guide. Alternatively, the system administrator or the migration engineer may construct the guide directly.

The discovery guide is a list indicating the system services on which applications depend on the source or the target platform (and possibly, the location of their configurations and/or the command for discovering their configurations). Based on their expert knowledge, the system administrator or the migration engineer may select possible system services that may be used by the applications to be migrated, so as to form the discovery guide. Such information may be used as the input of the discovery agent 101/setting agent to guide it to capture the configurations of necessary system services. That is to say, the discovery agent 101 may directly acquire the system services in the discovery guide as the system services on which applications depend, and, based on the location of the system service configurations and/or the command for acquiring the system service configurations indicated in the discovery guide, or the knowledge for acquiring the configurations of system services built in the discovery agent 101, or instructions from the user, may also acquire their configurations. This will make it spend less time to discover necessary system services through monitoring system calls made by the applications. In other words, all the system services indicated in the user guide are considered as system services that need to be migrated, so that the discovery agent 101 may discover their configurations directly without monitoring the calls to them. As such, the overhead of the monitoring can be reduced to a certain extent. The discovery guide is an optional auxiliary means in the present invention, that is, the present invention can be implemented without the discovery guide.

FIG. 4 shows a possible example of the discovery guide, which lists a variety of system services for the system kernel, SSH, user group management, file volume management and printer management, and indicates the commands for acquiring the configuration information of the system services or the location of the configuration files. For each system service, if the command filed is not blank, the discovery agent 101 may execute the command to acquire the system service configuration information; if the configuration file location field is not blank, the discovery agent 101 may acquire the information of the configuration files at the indicated location; otherwise, the discovery agent 101 may still discover the configurations using its built-in existing knowledge, that is to say, the commands, the configuration locations are optional in the discovery guide.

The discovery agent 101 may respond to a feedback from the setting agent 105 indicating the missing system services required by the applications, and discover/capture the configurations of the system services which have not been discovered in the previous discovery process, then provide them to the migration assistant module 102 to construct an instance of the dependency model representing the relationships between the new discovered system services and the other system services and the configuration information of such system services, and then convert the instance into an dependency model instance for the target platform. The new dependency model instance is sent to the setting agent 105 to set the new system services. Such a feedback/migration process may be repeated until all of the necessary system services have been discovered and migrated successfully.

Test cases may be used to help the discovery agent 101/setting agent 105 to discover more dependent relationships, and may help to perform error detection. The test cases can be designed by an application developer/tester/migration engineer, and can be used in integration test and system test to ensure that the applications to be migrated can operate correctly on the source/target platform. These test cases can be designed carefully to ensure the sufficient operation of the applications in order to make all the possible system service calls. As such, test cases can help the discovery agent 101/setting agent 105 to discover the system services required by applications as many as possible to facilitate the construction of the dependent relationships between the applications and the system services. The test cases not only can be used in the source platform to discover the system services on which applications depend, but also can be used on the target platform to discover missing system services and configuration errors in the migration. Further, through running the same test cases both on the source and target platforms, it can be ensured that the applications perform the same functions on the target platform as on the source platforms. The test cases are optional in the present invention, that is, the present invention can be implemented without the test cases.

As shown in FIG. 1, the apparatus for migrating system environment on which applications depend according to the embodiment of the present invention further comprises a migration assistant module 102. The migration assistant module 102 is used for: acquiring the discovery guide from the user, and providing it to the discovery agent 101 to reduce the workload of monitoring through the input of a migration expert; constructing an instance of the dependency model representing the configurations of the system services and their dependent relationships based on the system services on which applications depend and their configurations that have been discovered by the discovery agent 101; converting the dependency model instance for the source platform into that for the target platform based on the mapping relationships between the system services and their configurations on the source platform and the target platform; and transmitting the dependency model instance to the setting agent 105. In addition, particularly in a large date center or computing center, the migration assistant module 102 can divide the discovered configuration settings of the system services on multiple servers received from the discovery agent 101 into the common configurations and the specific configurations in a common-specific configuration model, and convert the common-specific configuration model for the source platform into that for the target platform.

According to an embodiment of the present invention, the migration assistant module mainly comprises the following three function modules:

The first function module is a discovery guide providing module for receiving from a migration engineer a discovery guide used to guide the discovery agent 101 to monitor the system services and to acquire their configurations, and providing the received discovery guide to the discovery agent 101. The discovery guide providing module may receive the discovery guide from the migration engineer through generating a user guide including all the system services in the source platform and providing it to the migration engineer for selecting there among, or the discovery guide providing module may receive the discovery guide directly from the migration engineer. In another embodiment of the present invention, the discovery guide may be independent of the migration assistant module 102 as a separate module, or may be located in the discovery agent 101. Alternatively, the apparatus of the present invention may also not comprise the discovery guide providing module, and the discovery guide can be provided to the discovery agent 101 by the user directly.

The second function module is a model constructor 103 for, when the configurations of the system services of the source platform have been discovered, constructing a dependency model instance representing the relationships among the system services and their configurations on the source environment based on the discovered information. Optionally the dependency model instance may be stored in a system configuration database, and preferably, the system configuration database may be provided with an interface, through which the configurations can be customized by a migration expert.

Preferably, the dependency model is a data structure representing the configurations of all the system services in an environment and the dependent relationships among the system services, for example, it may be a set of classes in an object oriented programming language, wherein each class represents a system service. An attribute of the class represents a configuration item of the system service, so that the dependent relationships among the system services may be represented as the dependent relationships among these classes. When the discovery agent 101 has discovered the system services required by applications, some corresponding classes may be selected from the set of classes to form a subset thereof. When the configurations of the required system services have been discovered, the selected classes may be instantiated, i.e., constructing an instance of the dependency model. At this time, the configuration items of the system services get values, that is, the values in the source environment.

In a preferred embodiment of the present invention, when the apparatus of the present invention is used to migrate a system environment on which applications depend from multiple source platforms to multiple target platforms, the model constructor 103 is further used to classify the discovered system services configurations into common configurations and specific configurations, and to construct a common-specific configuration model representing such classification. As such, when a configuration error occurs, the common-specific configuration model may be used to check the category of the configuration, and then perform different processing for different categories. The common-specific configuration model is constructed as a hierarchical structure. The top level represents the common configurations of all the platforms, and the next level represents the configurations shared by some of the platforms. The lowest level represents configurations specific to a single platform. The common-specific configuration model also can be constructed by a module other than the model constructor 103, such as a module inside or outside the migration assistant module 102.

The third function module is a configuration converter 104, which is used to convert the dependency model instance for the source platform into a dependency model instance for the target platform. Preferably, it can be done by finding or reading the mapping relationships between the system services and their configurations of the source and the target platforms, and mapping the system services configurations on the source platform into the system services configurations on the target platform based on the read mapping relationships. That is to say, the configuration converter 104 can convert the dependency model instance for the source platform into the dependency model instance for the target platform through mapping the system services and their configurations on the source platform into the system services and their configurations on the target platform according to the mapping relationships, in order to utilize the information in such an instance to plan and set the configurations of the system services.

In a preferred embodiment of the present invention, there is further provided an optional configuration mapping database for storing the knowledge required for mapping the system services between different platforms, usually in the form of a series of mapping tables. These map knowledge can be defined, stored and edited by a migration expert etc. The configuration converter 104 may perform the configuration mapping by querying this database. Alternatively, after receiving the system services and their configurations on the source platform captured by the discovery agent 101, the configuration converter 104 may interact with the migration engineer directly to perform the mapping between the system services and their configurations on the source platform and the target platform. That is to say, the configuration mapping database may not present in an embodiment of the present invention.

As shown in FIG. 1, the apparatus for migrating a system environment on which applications depend according to the embodiment of the present invention may further comprise a setting agent 105, which is used to set system service configurations on the target environment based on the dependency model instance for the target environment generated by the configuration converter module. It should be noted that, a system service should be configured before those depending on it. In general, there may be multiple system services in a migration, and each of them may comprise many configuration items needing to be set in the target environment. So the setting agent 105 or the migration assistant module 102 may preferably plan the information to be set according to an algorithm or some built-in knowledge, i.e., forming a so-called environment setting plan, and then set the configurations on the target environment according to the plan. In a preferred implementation, the setting agent 105 is in the form of a set of scripts for setting configurations and a function module which is used to control such scripts. The function of the function module is to dispatch the scripts to set values in the target environment after receiving the setting plan. This may be achieved by writing the configurations into files on the target platform or by executing specific commands on the target platform.

It should be noted that, through monitoring status of the applications that have been migrated, the setting agent 105 may provide a feedback about what system services are missing on the target platform to the discovery agent 101. The feedback sent to the discovery agent 101 is used to drive the discovery agent 101 to start a new discovery process, in order to discover/capture the missing system services on the source platform. To enable the feedback mechanism, like the discovery agent 101, the setting agent 105 has the ability of discovering the system services and their configurations on the target platform.

The apparatus for migrating a system environment on which applications depend according to the embodiment of the present invention has been described above. It should be noted that, the illustrated and described modules of the apparatus and their relationships is only an example, and not limitation of the present invention. In other embodiments of the present invention, the apparatus may have more, less or different modules and the relationships between the modules may be changed. The functions of a plurality of modules may be combined into a single module, and the function of a module may be distributed over several modules too. The connection relationships between modules may be changed also. And these variations are all within the scope of the present invention. For example, the three functions of the discovery agent 101: discovering the system services on which applications depend directly, obtaining the system services on which the applications depend indirectly based on the dependency among the system services, and discovering the configurations of the system services may also be achieved by three separate modules, or the second and the third functions may be achieved by the migration assistant module 102. As another example, the two functions of the model constructor 103: generating the dependency model instance, and generating the common-specific configuration model, may also be achieved by two separate modules. As a further example, one or more of the three functions of the migration assistant module 102 may be separated from the migration assistant module 102 to form separate modules, or to be combined into the discovery agent 101. As a further example, the model constructor 103 may not present in the apparatus for migrating a system environment on which applications depend according to an embodiment of the present invention, so that, the discovery agent 101 may provide the discovered system services on which applications depend directly or indirectly and their configurations to the configuration converter 104 directly to convert them into the system services on which applications depend directly or indirectly and their configurations on the target platform, and the setting agent 105 may set the system services and their configurations on the target platform based on the system services on which applications depend directly or indirectly on the target platform and their configurations, and the obtained dependency among these system services, thus migrating system services from the source platform to the target platform.

Figure 5:
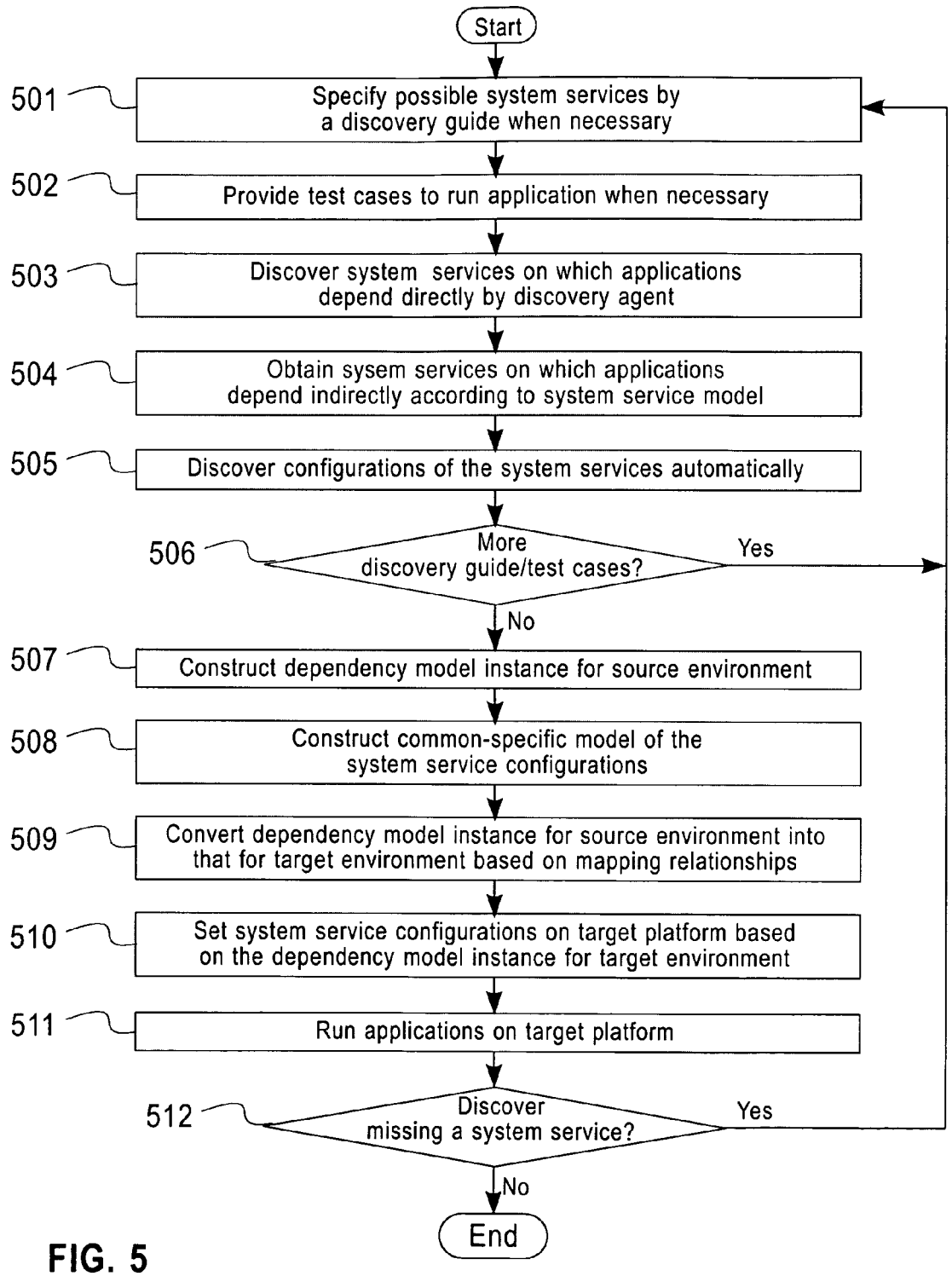
FIG. 5 is a flow chart of the method for migrating the system services on which applications depend according to an embodiment of the present invention.

Next, the method for migrating a system environment on which applications depend according to an embodiment of the present invention will be described with reference to the FIG. 5. For the convenience of description, the method will be described with reference to the apparatus according to the embodiment of the present invention described above. However, it will be appreciated by those skilled in the art that, the method for migrating a system environment on which applications depend may also be implemented with other apparatus different from the above-described apparatus. As shown in FIG. 5, the method for helping to migrate a system environment automatically between different platforms by migrating only the system services on which applications depend directly or indirectly comprises the following steps:

In step 510, optionally, a discovery guide is provided indicating the system services possibly required by the applications, which will reduce the time and cost required for acquiring such system services by the discovery agent 101.

The discovery guide is a list indicating the system services on which the applications depend directly or indirectly on the source or the target platform (and possibly the locations of the configurations of the system services or the commands for acquiring the system service configurations) as determined by the system administrator or the system migration engineer with their expert knowledge. Such information may be used as an input to the discovery agent 101, and the discovery agent 101 may directly discover the system services in the discovery guide as the system services on which applications depend, and may obtain the configurations of the system services based on the locations of the system service configurations and/or the commands for discovering the system service configurations as indicated in the discovery guide, or the knowledge for acquiring the configurations of system services built in the discovery agent 101, or instructions from the user. The discovery guide may either be provided directly to the discovery agent 101, or be provided to the discovery agent 101 through a discovery guide providing module, or another module. The discovery guide is an optional auxiliary means in the present invention, that is, the method of the present invention may not comprise the step of providing discovery guide.

In step 502, optionally, some test cases are provided to the source platform to make the applications operate sufficiently to discover all the required system services. The test cases designed by an application developer/tester/migration engineer are used in an integration test and system test to ensure that the applications to be migrated can operate correctly on the source/target platform. These test cases can be designed carefully to ensure the sufficient operation of the applications, making all the possible system service calls. As such, the test cases can help the discovery agent 101/setting agent 105 to discover the system services required by applications as many as possible to facilitate the construction of the dependent relationships between the applications and the system services. The test cases can not only be used in the source platform to discover the system services on which applications depend, but also be used on the target platform to discover missing system services in the migration and the configuration errors occurring due to the migration. Furthermore, through running the same test cases on both of the source and the target platforms, it can be ensured that the applications perform the same functions on the target platform as on the source platform. The test cases are optional in the present invention, that is, the step of providing test cases to the source platform may not be included in the method of the present invention, in which case the system services on which applications depend should be discovered in the normal operation of the applications.

In step 503, during the operation of the applications on the source platform, the discovery agent 101 discovers the system services on which applications depend directly. The discovery agent 101 may, for example, discover the system services on which applications depend directly through capturing the system services calls made by applications during the operation of the applications by a probe. For example, in Windows platform, the hook APIs provided in Windows system can be used to inject the probe of the discovery agent 101 as a DLL into a daemon responsible for dispatching all processes to capture all function calls occurring in run time for further analysis. As such, the probe can capture all the direct system service calls made by application processes.

In step 504, based on the dependency model of the system services on the source platform, which is used as a priori knowledge, and the system services on which applications depend directly as discovered in the previous step, the system services on which the applications depend indirectly are obtained. The dependency model of the system services on the source platform, which is used as a priori knowledge, can be either stored in the discovery agent 101 or in the migration assistant module 102, or it can be stored separately, such as in a database. The dependency model can be created and edited by a system administrator or migration engineer in advance. After the discovery agent 101 has discovered the system services on which applications depend directly, a sub-model of the dependency model, that is, a data model reflecting the dependent relationships between the applications and the system services on which the applications depend directly or indirectly, can be obtained by mapping the discovered system services to the dependency model, and then using a simple mathematical method to infer the system services on which applications depend indirectly. This step may be performed by the discovery agent 101 or the migration assistant module 102 or some function module therein, or be performed by another module.

In step 505, the configurations of the system services on which the applications depend directly or indirectly on the source platform are discovered automatically. A preferred method for discovering the configurations is for the discovery agent 101 or another module to invoke a shell script for a corresponding system service to capture its configurations. For example, a script associated with the NFS service can be used to capture all the configurations of a NFS server, that is, the configurations in the NFS sharing records in the servers. The results of the configuration discovery are used to construct a dependency model instance representing the current configurations of the source platform. The configuration files of the system services are usually located in a specific directory of an OS, for example, the directory /etc of a Unix/Linux OS stores the configuration files of many system services, and these files have fixed file names. In addition, the system service configurations may also be obtained by specific OS commands, e.g., obtaining the kernel configurations of an OS by a command. In an embodiment of the present invention, the scripts written for various system services for discovering configurations may be built into the discovery agent 101; in another embodiment of the present invention, the scripts may be built into the migration assistant module 102; of course, the scripts can also be in a separate module. That is to say, this step can be performed either by the discovery agent 101 or the migration assistant module 102, or it can be performed by another separate module. When the discovery agent 101 has known what system services need be discovered through a preliminary monitoring, it can invoke the corresponding script to find the system service configurations. The script acquires the system service configurations through reading the configuration files of a specific service in a particular directory, or executing a specific OS command. In rare cases, the location of some configurations on a server may have been customized by a system administrator, such as, by changing the name of a configuration file artificially. In such a case, it is needed to interact with the user to provide the changed information. Apart from using scripts, other methods, such as interacting with the user, can be used to cause the discovery agent 101 or the migration assistant module 102 to discover the system service configurations.

In step 506, it is determined whether any other discovery guides or test cases exist. If so, the method returns to step 501 to repeat the above steps for other discovery guides or test cases until all of the discovery guides or test cases have been processed. Step 506 can be performed by the discovery agent 101, the migration assistant module 102, or another separate module.

In step 507, based on the discovered and obtained system services on which applications depend directly or indirectly, the dependency model reflecting the dependent relationships of the system services and their configurations, a dependency model instance representing the dependent relationships of the discovered system services and their configurations on the source platform is constructed. The dependency model instance is a data structure, such as a tree or a graph. Optionally the dependency model instance for the source platform may be stored in a system configuration database, and preferably, the dependency model instance may be provided with an interface, which can be used to customize the configurations by a migration expert. Preferably, the dependency model is a data structure representing the configurations of all the system services in an environment and the relationships among these system services, for example, in an object oriented programming language, it may be a set of classes, each of which represents a system service. The attribute of a class is a configuration item of the system service, as such, the dependent relationships among the system services may be represented as the dependent relationships among these classes. When the discovery agent 101 has discovered all the system services required by the applications, some classes may be extracted from the set of classes to form a subset thereof. When the configurations of the required system services have been discovered, the selected classes may be instantiated, i.e., constructing an instance of the dependency model. At this time, the configuration items of the system services may get values, that is, values on the source environment. This constructing step may be performed by the discovery agent 101 or the migration assistant module 102 or another separate module.

In step 508, the discovered system service configurations are classified, and a common-specific configuration mode is constructed. This step is applicable for migrating a system environment on which applications depend from multiple source platforms to multiple target platforms. The model is constructed in a hierarchical form, and the top level representing the common configurations of all platforms, the next level representing the configurations shared by some of the platforms, and the lowest level representing configurations specific to a single platform. When a configuration error occurs, the common-specific configuration model may be used to check the category of the configuration, and then different processing may be performed according to different categories. This step can be performed by the model constructor 103 in the migration assistant module 102, or another module inside or outside the migration assistant module 102.

In step 509, based on the mappings between the system service configurations on the source platform and the target platform, the dependency model instance for the source platform is converted into the dependency model instance for the target platform. For example, the mapping relationships may be acquired by querying a migration configuration mapping database containing the mapping relationships between the system services on different platforms. Alternatively, interaction with the migration engineer can be made directly after receiving the system services and their configurations on the source platform to achieve the mapping of the system services configurations from the source platform to the target platform. Preferably, this step can be performed by the configuration converter 104 in the migration assistant module 102, or another module inside or outside the migration assistant module 102.

In step 510, the setting agent 105 sets the system service configurations on the target environment based on the dependency model instance for the target environment in order to finish migrating the configurations of the system services from the source platform to the target platform. It should be noted that, a system service should be set before those depending on it. In general, there may be multiple system services in a migration, and each of them may comprise many configuration items to be set in the target environment. So the setting agent 105 or the migration assistant module 102 may preferably plan the information to be set according to an algorithm or built-in knowledge, i.e., forming a so-called environment setting plan, and then set the configurations on the target environment according to the plan. In a preferred implementation, the setting agent 105 is in the form of a set of scripts for setting configurations and a function module which is used to control such scripts. The function of the control module is to dispatch the scripts to set values on the target environment after receiving the setting plan. This may be achieved by writing the configurations into files on the target platform, or by executing specific commands on the target platform.

In step 511, the applications may be run on the target platform to discover the missing system services or configuration errors. The same test cases may be used on both of the source and the target platforms to ensure that the applications can operate correctly on the target platform, and perform the same functions as on the source platform.

In step 512, after migrating the applications to the target platform, if some missing system services have been discovered, a feedback can be provided to the discovery agent 101, and the process returns to step 501 to restart the discovery process in order to discover the system services on which the missing system services depend and their configurations, so that the other steps described above may be performed.

The above processes can be repeated until there is not any other missing system service.

The method for migrating a system environment on which applications depend according to an embodiment of the present invention has been described above. It should be noted that, the steps illustrated and described in the method are only illustrative, and not limitation to the present invention. In other embodiments of the present invention, the method for migrating a system environment on which applications depend may comprise less, more or different steps. The executing sequence of some of these steps can be changed or some of them can be preformed in parallel. For example, it is possible either to discover all the system services on which applications depend directly on the source platform, and then obtain the system services on which these system services depend, i.e., the system services on which applications depend indirectly based on the dependency model of the system services on the source platform, and then acquire the configurations of the system services on which applications depend directly or indirectly; or whenever discovering a system service on which applications depend directly, to obtain the system services on which this system service depends based on the dependency model of the system services on the source platform, and then discover the next system service on which applications depend directly and the system services on which that system service depends until discovering all the system services on which applications depend directly or indirectly, and then acquire the configurations of these system services. It is also possible to discover the configurations of a system service on which applications depend directly or indirectly as soon as the system service is discovered. As another example, the dependency model instance for the source platform can either be constructed, after discovering and obtaining all the system services on which applications depend directly or indirectly and their configurations, by using the dependency model of the system services of the source platform, i.e., extracting a sub model containing the discovered system services on which applications depend directly or indirectly from the dependency model of the system services on the source platform, and setting configuration values for each system service in the sub model; or be obtained by, after discovering the system services on which the applications depend directly, obtaining the system services on which applications depend indirectly through the dependency model of the system services on the source platform, while extracting a sub model containing the system services on which applications depend directly or indirectly from the dependency model, and then after discovering the configurations of system services on which applications depend directly or indirectly, setting configuration values for the system services in the sub model. Moreover, the step of generating the dependency model instance of the source platform may not be present, so that after discovering and obtaining the system services on which applications depend directly or indirectly and their configurations, and mapping the configurations to the configurations on the target platform, it is possible to set configurations on the target platform based on the dependent relationships among the system services.

The common-specific configuration model of the system service configurations generated in step 508 may be used to find the source of an error and correct the error when the configuration error is reported after migrating the applications from multiple source platforms to multiple target platforms. When a configuration error occurs, the category of the configuration can be checked. If the configuration belongs to a specific configuration, the error should be handled separately. If the configuration belongs to a common configuration, other platforms should be checked to see whether the same error exists. If so, it may be due to a wrong migration decision. Otherwise, the checking of the common configuration can be skipped, and the specific configurations on the platform where the error occurs may be checked.

Figure 6:
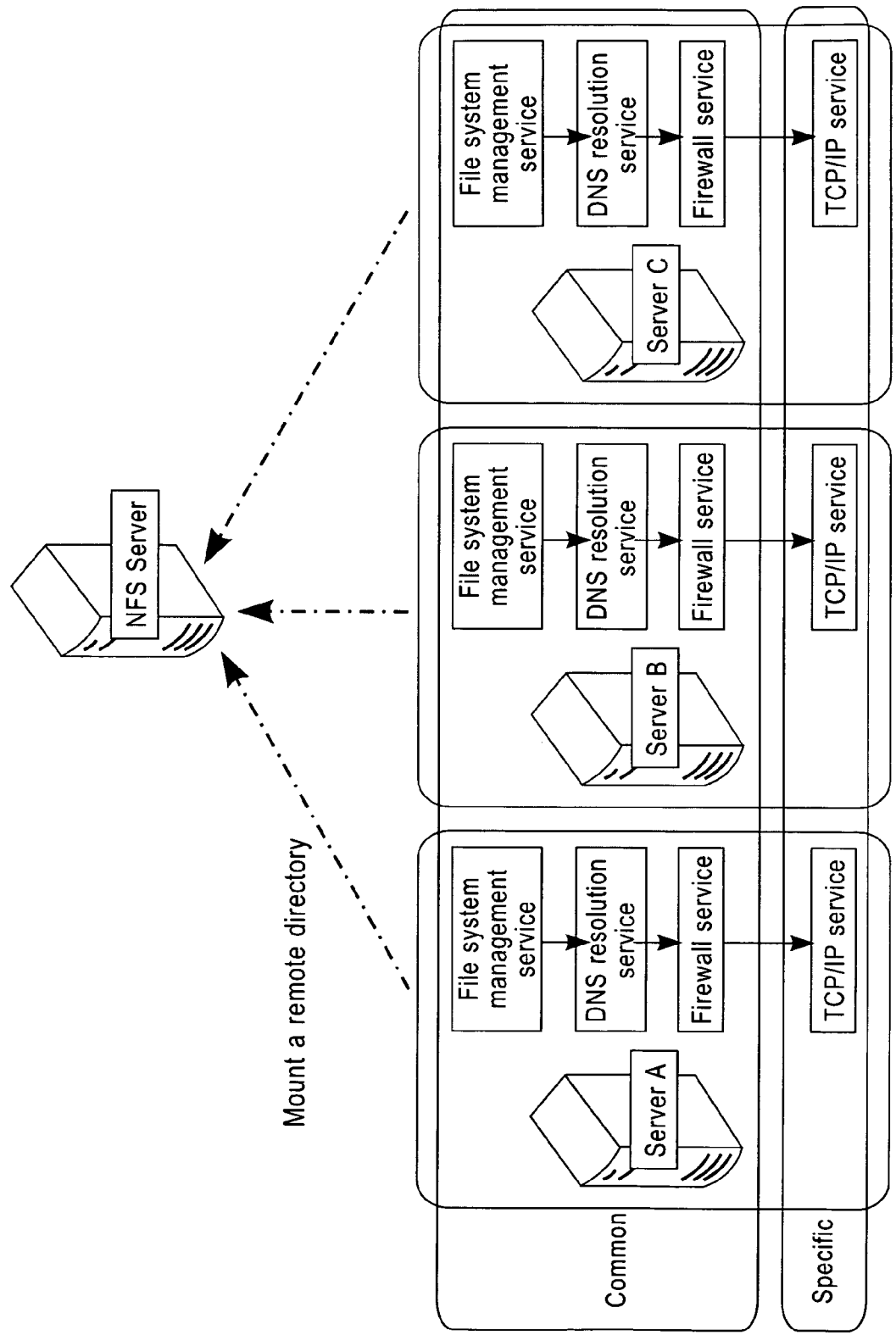
FIG. 6 shows an example of a distributed system that can be used to illustrate the process of finding and correcting configuration errors with the common-specific configuration model.

In order to illustrate the process of discovering the source of configuration error and correcting a configuration error using the common-specific configuration model, an example of a distributed system is shown in FIG. 6. In this distributed system, several machines are configured to mount a remote directory from a NFS server. The file system management services in these machines are configured to include the remote mounting records, and the machines have the same DNS configurations and the same firewall configurations because they use the same DNS server and all the firewalls permit NFS mounting. If one of the machines cannot mount a remote directory successfully, in a usual process, the configurations of the file system management service, the DNS resolution service, the firewall service and the TCP/IP service will be checked in turn to discover the source of the problem. However, after incorporating the common-specific configuration model according to the present invention into that process, if the problem does not present in other machines in the distributed environment, the checking of the same file system management services, the DNS resolution services, the firewalls can be skipped. The TCP/IP configuration is likely the source of the problem because it is specific to that machine.

Figure 7:
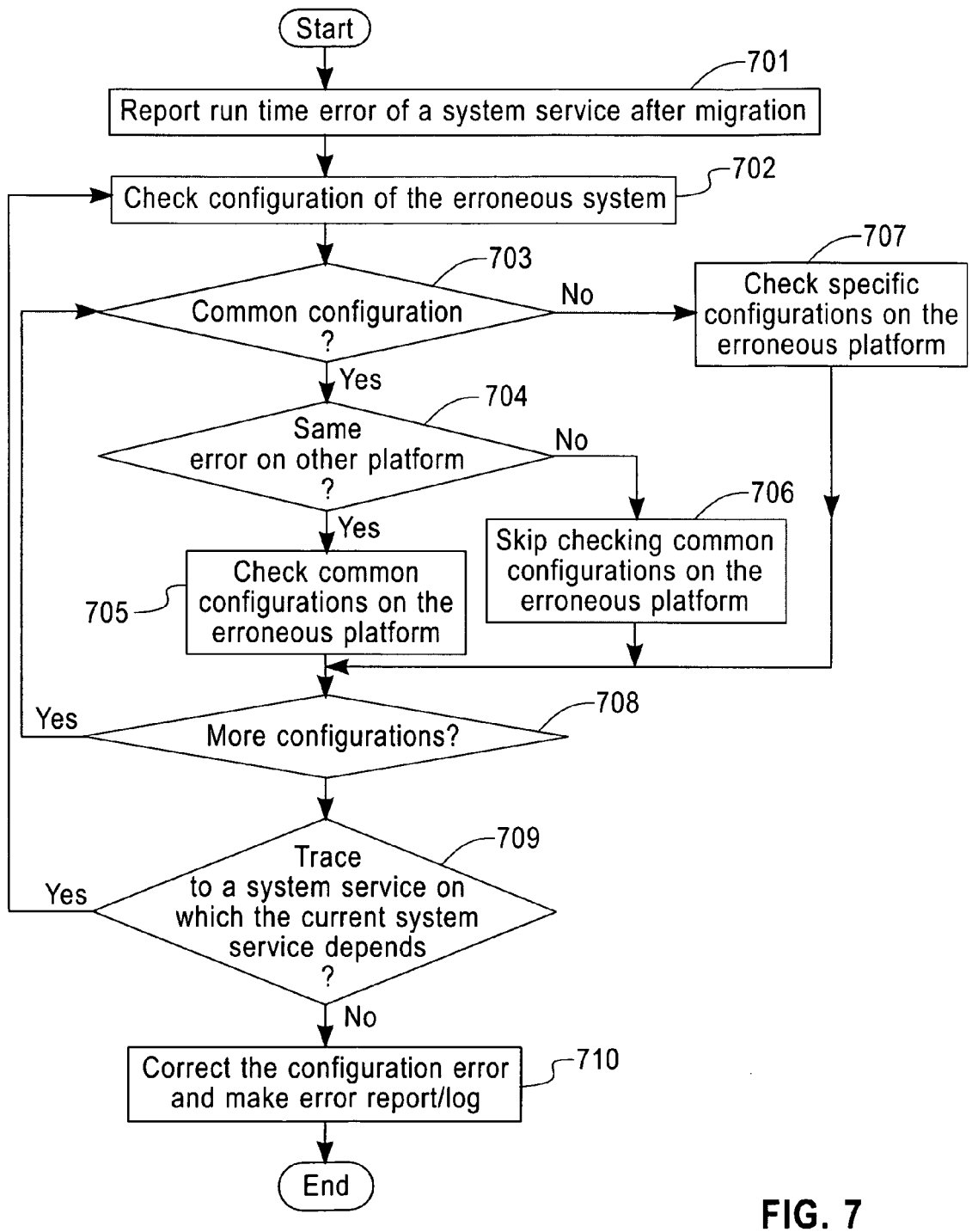
FIG. 7 shows a flow chart of the method for finding and correcting configuration errors when reporting errors after migrating applications from multiple source platforms to multiple target platforms according the embodiment of the present invention.

FIG. 7 shows a flow chat of the method for finding the source of a configuration error and correcting the configuration error when the error is reported after migrating applications from multiple source platforms to multiple target platforms according to the embodiment of the present invention.

As shown in FIG. 7, after the process starts, in step 701, after migrating applications from multiple source platforms to multiple target platforms, a system service run-time error is reported during the operation of the applications on a target platform.

In step 702, configurations of the erroneous system service are acquired. The configurations of the erroneous system service on the target platform can be acquired using the same method as that of acquiring the configurations of a system service on the source platform by the discovery agent 101.

Then, in step 703, it is determined whether the system service configuration is a common configuration. It can be determined based on the common-specific configuration model obtained in the migration of the system environment on which applications depend.

If it is not in step 703, the process proceeds to step 707. If it is yes, the process proceeds to step 704.

In step 704, it is determined whether the same error is present in other platforms.

If it is not in step 704, the process precedes to step 706. If it is yes, the process proceeds to step 705.

In step 705, the common configurations on the platform where the error occurred are checked, and then the process proceeds to step 708.

In step 706, the checking of the common configurations on the platform where the error occurred is skipped, and then the process proceeds to step 708.

In step 707, the specific configurations on the platform where the error occurred are checked, and then the process proceeds to the step 708.

In step 708, it is determined whether there is any other configuration to be checked.

If it is yes in step 708, the process returns to step 703. Otherwise, the process proceeds to step 709.

In step 709, it is determined whether there is any system service on which the current system service depends. It can be determined by referring to the dependency model instance for the target platform as obtained during the migration.

If it is yes in step 709, the process returns to step 702. If it is not, the process proceeds to step 710.

In step 710, the configuration error is corrected, and an error report/log is made.

Then, the process ends.

In another aspect of the present invention, there are also provided a method and an apparatus for migrating applications. The apparatus for migrating applications according to an embodiment of the present invention comprises the apparatus for migrating user's system environment according to the embodiment of the present invention described above, and means for migrating applications. The method for migrating applications according to an embodiment of the present invention includes the following steps: migrating the system services on which applications depend directly and indirectly from the source platform to the target platform using the method for migrating system environment on which applications depend according to the embodiment of the present invention described above; and migrating applications from the source platform to the target platform. The means for migrating applications can adopt any means for migrating application, and the step of migrating applications from the source platform to the target platform can use any method for migrating applications from the source platform to the target platform in the prior art, so their detailed description are omitted here.

It should be noted that, as known by those skilled in the art, the method of the present invention is not limited to a specific OS platform, but rather can be used in various OS platforms, such as Windows, Unix/Linux, etc. It is because that most system services can be found on various platforms, and many configurations comply with the same or similar specifications, such as network related system services, e.g., IP address, subnet mask and gateway, DNS, FTP, etc, perhaps only having different implementations, that is, the application programs implementing the system services may be different. On the other hand, the behavior and functions of system services depend on their configurations, and their configurations can be migrated. So what the present invention is concerned with is to make the system service configurations the same on the target platform as on the source platform so that they have the same behavior to a certain extent. Therefore, the apparatus and method of the present invention can not only be used for migrating system services on which applications depend between the same OS platforms, between the different versions of a same OS platform, and between the same kind of OS platforms, but also be used for migrating system services on which applications depend between different kinds of OS platforms, such as, the migration between a Unix/Linux platform and Windows platform. It should be noted that, due to the difference between the two platforms, the migration between a Unix/Linux platform and Windows platform needs more complex configuration mappings, possibly involving not only the mapping of the configuration values, but also the mapping of many configuration items.

The apparatus for migrating system services on which applications depend according to the present invention can be located in a separate computer or another apparatus, or can be located in the source platform computer or the target platform computer. Preferably, the migration assistant module of the present invention can be located in a separate computer, which can be connected to one or more source platform computers through a network, and the discovery module in the apparatus of the present invention can be located in the source platform computer, and the setting module in the apparatus of the present invention can be located in the target platform computer. As such, the modules of the apparatus and the source platform computer and the target computer system can communicate through the network to achieve the online migration of system environment on which applications depend from the source platform to the target platform. Alternatively, the computer in which the migration assistant module is located may communicate with one or more source platform computers through a network, but not connect to one or more target platform computers through the network. As such, after the migration assistant module has accessed the source machine and acquired required information through the discovery agent, the information can be carried to the target platform computers with portable storage media to achieve the migration. Or, the computer in which the migration assistant module is located may not connect to either of the source platform computers and the target platform computers, and after acquiring the required information through the discovery agent installed in the source platform computers, the information can be carried to the computer in which the migration assistant module is located with a portable storage media, etc, for processing in order to achieve the migration. In addition, the discovery module and the setting module in the apparatus of the present invention can also be transmitted to the source platform computers and the target platform computers through a network at the beginning of the migration.

The present invention can be implemented as hardware, software, firmware or any combination thereof. It can be implemented in a central form in one computer system, or can be implemented in a distributed form. In the case of the distributed form, different components are distributed over several computer systems connected each other. Any computer system or other apparatus adapted to implement the methods described herein is suitable. A typical combination of hardware and software is a general purpose computer system with computer programs, which, when being loaded and executed, control the computer system to cause it to implement the method described herein. The present invention can also be embodied in computer program product, which comprises all the features enabling the implementation of the methods herein, and which when loaded in a computer system is able to carry out these methods.

Further, it is appreciated that, at least some aspects of the present invention may be implemented in a computer usable storage device comprising a program product comprising computer executable instructions configured to implement the steps of the methods of the present invention. The program defining the functions of the present invention can be sent to a data storage system or computer system by various signal bearing medias, including but not limited to read only storage media, such as CD-ROM, recordable-type storage media, such as floppy disk, hard disk driver, write/read CD, optical media, and transmission-type media, such as computer and telephone network, including Ethernet, etc. Hence, it should be understood that, when carrying or encoding the computer readable instructions for the implementation of the method of the present invention, the signal bearing media represents another alternative embodiment of the present invention.

Although, the present invention has been illustrated and described with reference to the preferred embodiment, it should be understood by those skilled in the art that, various modifications can be made both in form and details therein without departing from the spirit and scope of the present invention.

We claim:

1. A method of migrating a system environment on which one or more applications depend between platforms, comprising the steps of:
   discovering system services on which the one or more applications depend directly during operation of the one or more applications on a source platform having a plurality of system services;
   obtaining system services on which the one or more applications depend indirectly from:
     a dependency model of the plurality of system services on the source platform; and
     the discovered system services on which the one or more applications depend directly;
   discovering configurations of the system services on which the one or more applications depend directly and indirectly;
   generating a dependency model instance for a source environment reflecting:
     relationships among the system services on which the applications depend directly and indirectly; and
     the configurations of the system services on the source platform;
   from:
     the dependency model of the plurality of system services on the source platform;
     the discovered and obtained system services on which the applications depend directly and indirectly, respectively; and
     the discovered configurations thereof;

converting the dependency model instance for the source environment into a dependency model instance for the target environment reflecting:
the relationships among the system services on which the applications depend directly and indirectly; and
their configurations on the target platform;
according to:
the mapping relationships between the system services on which the applications depend directly and indirectly; and
their configurations on the source platform and the target platform; and
setting the system services on which the applications depend directly and indirectly and their configurations on the target platform according to the dependency model instance for the target platform, to realize the migration of the system environment on which the applications depend from the source to the target platform.

2. The method according to claim 1, further comprising the step of:
feeding back information about missing system services discovered during the operation of the applications on the target platform to the source platform, to repeat the steps of obtaining the system services, discovering the configurations, generating the dependency model instance for the source environment, converting the dependency model instance for the source environment, and setting the system services.

3. The method according to claim 1, wherein the step of discovering the system services on which the applications depend directly further comprises performing the step of discovering by means of a system service discovery guide listing the system services on which the applications depend directly.

4. The method according to claim 1, wherein the step of discovering the system services on which the applications depend directly comprises:
discovering the system services on which the applications depend directly by the monitoring system service calls made by the applications.

5. The method according to claim 4, wherein the step of discovering the system services on which the applications depend directly further comprises discovering the system services on which the applications depend by running test cases for the applications on the source platform.

6. The method according to claim 1, further comprising the step of, when a configuration error is reported during the operation of the migrated applications on the target platform, using the dependency relationships among the system services on which the applications depend directly and indirectly on the target platform as reflected in the dependency model instance for the target platform to find and solve the source of the configuration error in a path of system service dependency.

7. The method according to claim 1, wherein there are a plurality of source platforms and a plurality of target platforms, and wherein the method further comprises:
establishing a common-specific configuration model of the system service configurations on the source platforms from the discovered configurations of the system services on which the applications depend directly and indirectly on the source platforms, in which model the system service configurations is placed in different levels depending on whether a system service configuration is specific to a single platform, or shared by some or all of the platforms;
converting the common-specific configuration model of the system service configurations on the source platforms into that on the target platforms according to the dependency model instance for the source environment and the dependency model instance for the target environment; and
solving and finding the source of the configuration error in a path of system service dependency when a configuration error is reported during the operation of the migrated applications on the target platforms, using the dependency relationships among the system services on which the applications depend directly and indirectly and the common-specific configuration model of the system service configurations on the target platforms.

8. The method according to claim 7, wherein the step of using the common-specific configuration model of the system service configurations on the target platforms to find and solve the source of the configuration error in a path of system service dependency comprises: when the configuration error is reported during the operation of an application on one target platform but not on other target platforms, skipping checking the configurations common to this target platform and the other target platforms in the configurations of the system services on which the application depends directly and indirectly.

9. A method for migrating applications between platforms, comprising:
migrating system services on which the applications depend directly and indirectly from a source platform to a target platform by:
discovering said system services on which one or more of said applications depend directly during operation of the one or more applications on said source platform, said source platform having a plurality of said system services;
obtaining said system services on which the one or more applications depend indirectly from:
a dependency model of the plurality of system services on the source platform; and
the discovered system services on which the one or more applications depend directly;
discovering configurations of the system services on which the one or more applications depend directly and indirectly;
generating a dependency model instance for a source environment reflecting:
relationships among the system services on which the applications depend directly and indirectly; and
the configurations of the system services on said source platform;
from:
the dependency model of the plurality of system services on the source platform;
the discovered and obtained system services on which the applications depend directly and indirectly, respectively; and
the discovered configurations thereof;
converting the dependency model instance for the source environment into a dependency model instance for a target environment reflecting:
the relationships among the system services on which the applications depend directly and indirectly; and
their configurations on the target platform;
according to:
the mapping relationships between the system services on which the applications depend directly and indirectly; and their configurations on the source platform and the target platform; and setting the system services on which the applications depend directly and indirectly and their configurations on the target platform according to the dependency model instance for the target platform, to realize the migration of the system environment on which the applications depend from the source to the target platform; and migrating the applications from the source platform to the target platform.

10. An apparatus for migrating a system environment on which one or more applications depend between platforms, comprising:

at least one memory;
at least one processor, coupled to said at least one memory;
at least one computer-readable storage medium;
a discovery agent in turn comprising a pluraljy of discovery agent instructions tangibly embodied on said at least one computer-readable storage medium in a non-transitory manner which when loaded into said at least one memory configure said at least one processor to discover the system services on which the applications depend during the operation of the applications on a source platform; wherein the discovery agent is configured to obtain the system services on which the applications depend indirectly from a dependency model of the system services on the source platform and the discovered system services on which the applications depend directly: wherein the discovery agent is configured to discover the configurations of the system services on which the applications depend directly and indirectly;

a migration assisting module, in turn comprising a plurality of migration assisting module instructions tangibly embodied on said at least one computer-readable storage medium in a non-transitory manner which when loaded into said at least one memory configure said at least one processor to implement:

a model constructor configured to generate a dependency model instance for the source environment reflecting:
the relationships among the system services on which the applications depend directly and indirectly; and
the configurations of the system services on the source platform;
from:
the dependency model of the system services on the source platform,
the discovered and obtained system services on which the applications depend directly and indirectly, respectively; and
the discovered configurations thereof;

a configuration converter configured to, according to:
the mapping relationships between the system services on which the applications depend directly and indirectly; and
their configurations on the source platform and target platform;
convert the dependency model instance for the source environment into that for the target environment reflecting:
the relationships among the system services on which the applications depend directly and indirectly; and
their configurations on the target platform; and a setting agent in turn comprising a plurality of setting agent instructions tangibly embodied on said at least one computer-readable storage medium in a non-transitory manner which when loaded into said at least one memory configure said at least one processor to set the system services on which the applications depend directly or indirectly and to set their configurations on the target platform according to the dependency model instance for the target environment to realize the migration of the system environment on which the applications depend from the source platform to the target platform.

11. The apparatus according to claim 10, wherein the discovery agent is further configured to:
receive a feedback about missing system services discovered during the operation of the applications on the target platform, as the system services to be discovered by the discovery agent.

12. The apparatus according to claim 10, wherein the discovery agent is further configured to perform the finding of the system services by means of a system service discovery guide listing the system services on which the applications depend directly.

13. The apparatus according to claim 10, wherein the discovery agent configured to discover the system services on which the applications depend directly is further configured to:
discover the system services on which the applications depend directly by monitoring the system service calls made by the applications.

14. The apparatus according to claim 10, wherein the discovery agent is further configured to discover the system services on which the applications depend directly by running test cases for the applications on the source platform.

15. The apparatus according to claim 10, wherein the dependency relationships among the system services on which the applications depend directly and indirectly on the target platform as reflected in the dependency model instance for the target environment can also be used to, when a configuration error is reported during the operation of the migrated applications on the target platform, find and solve the source of the configuration error in a path of system service dependency.

16. The apparatus according to claim 10, for use in connection with a plurality of source platforms and a plurality of target platforms,
wherein the model constructor is further configured to establish a common-specific configuration model of the system service configurations on the source platforms from the discovered configurations of the system services on which the applications depend directly and indirectly on the source platforms, in which model the system service configurations are placed in different levels depending on whether a system service configuration is specific to a single platform, or shared by some or all of the platforms;
wherein the mapping module is further configured to convert the common-specific configuration model of the system service configurations on the source platforms into that on the target platforms according to the dependency model instance for the source environment and the dependency model instance for the target environment; and
wherein the dependency relationships among the system services on which the applications depend directly and indirectly and the common-specific configuration model of the system service configurations on the target platforms can be used to, when a configuration error is reported during the operation of the migrated applications on the target platforms, find and solve the source of the configuration error in a path of the system service dependency.

17. The apparatus according to claim 16, wherein the common-specific configuration model of the system service configurations on the target platforms used to, when a configuration error is reported during the operation of a migrated application on the target platforms, discover and solve the source of the configuration error in a path of system service dependency is used to, when a configuration error is reported during the operation of the application on one of the target platforms but not on other target platforms, skip checking the configurations common to this target platform and the other target platforms in the configurations of the system services on which the application depends directly and indirectly.

18. An article of manufacture comprising a computer program product for migrating a system environment on which one or more applications depend between platforms, the computer program product comprising:
  a tangible computer-readable storage medium, storing in a non-transitory manner computer readable program code, the computer readable program code comprising:
  computer readable program code configured to discover system services on which the one or more applications depend directly during operation of the one or more applications on a source platform;
  computer readable program code configured to obtain the system services on which the one or more applications depend indirectly from a dependency model of the system services on the source platform and the discovered system services on which the one or more applications depend directly;
  computer readable program code configured to discover the configurations of the system services on which the one or more applications depend directly and indirectly;
  computer readable program code configured to generate a dependency model instance for a source environment reflecting:
    relationships among the system services on which the applications depend directly and indirectly; and
    the configurations of the system services on the source platform
  from:
    the dependency model of the plurality of system services on the source platform:
    the discovered and obtained system services on which the applications depend directly and indirectly, respectively; and
    the discovered configurations thereof;
  computer readable program code configured to convert the dependency model instance for the source environment into a dependency model instance for the target environment reflecting:
    the relationships among the system services on which the applications depend directly and indirectly; and
    their configurations on the target platform;
  according to:
    the mapping relationships between the system services on which the applications depend directly and indirectly; and
    their configurations on the source platform and the target platform; and
  computer readable program code configured to set the system services on which the applications depend directly and indirectly and their configurations on the target platform according to the dependency model instance for the target platform, to realize the migration of the system environment on which the applications depend from the source to the target platform.

* * * * *